No. 893,322. PATENTED JULY 14, 1908.
R. K. GREGORY.
RESILIENT WHEEL.
APPLICATION FILED DEC. 23, 1907.
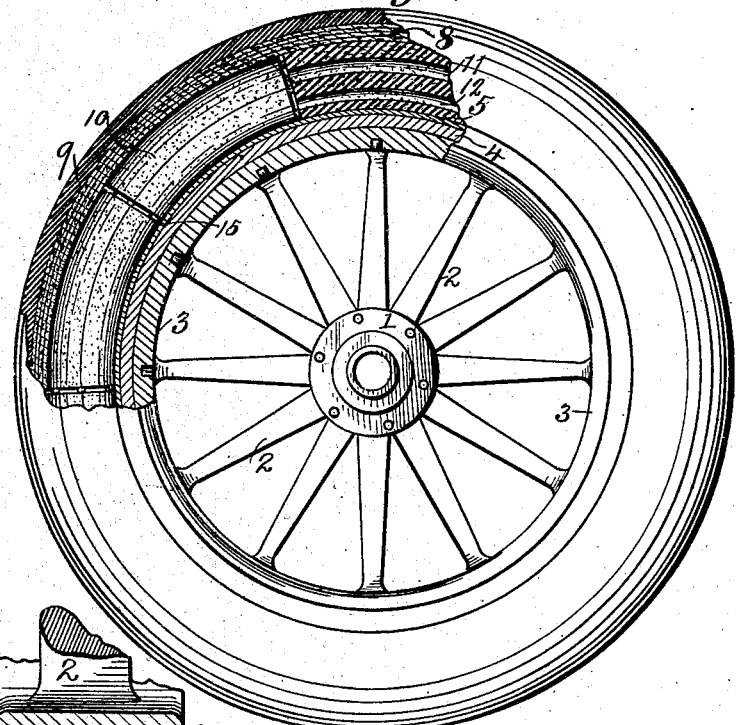
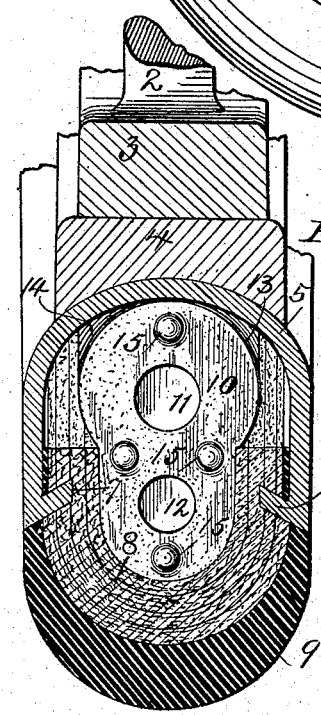
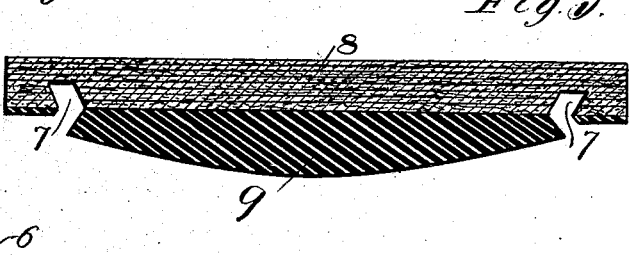
Witnesses
Inventor
Richard K. Gregory,
By
Attorney

UNITED STATES PATENT OFFICE.

RICHARD K. GREGORY, OF GREENSBORO, NORTH CAROLINA, ASSIGNOR OF ONE-HALF TO JOHN H. WHITE, OF BALTIMORE, MARYLAND.

RESILIENT WHEEL.

No. 893,322.      Specification of Letters Patent.      Patented July 14, 1908.

Application filed December 23, 1907. Serial No. 407,703.

*To all whom it may concern:*

Be it known that I, RICHARD K. GREGORY, citizen of the United States, residing at Greensboro, in the county of Guilford and State of North Carolina, have invented certain new and useful Improvements in Resilient Wheels, of which the following is a specification.

This invention comprehends certain new and useful improvements in resilient wheels, and the invention has for its object a wheel of this type which will possess to a marked degree the characteristics of safety and security, strength, durability, and elasticity, and at the same time be capable of being inexpensively manufactured and easily applied, and which will be puncture-proof to all practical intents and purposes, thereby eliminating all elements of accident and danger attendant upon the use of the ordinary pneumatic tires, my improved wheel being devoid of pneumatic tubes with their valves and other accessories, the resiliency being obtained by a peculiar construction and arrangement of parts that I shall hereinafter fully describe and then point out the novel features in the appended claims.

For a full understanding of the invention, reference is to be had to the following description and accompanying drawings, in which:

Figure 1 is a side elevation of a wheel constructed in accordance with the principles of my invention; parts being broken away; Fig. 2 is an enlarged transverse sectional view through the rim portion of the wheel; Fig. 3 is a detail view of a portion of the tire in its flattened position.

Corresponding and like parts are referred to in the following description and indicated in all the views of the drawings by the same reference characters.

Referring to the drawing, the numeral 1 designates the hub of my improved resilient wheel, 2 the spokes, and 3 the felly or spoke rim, all of such parts being of any desired construction, shape or design.

4 designates a strengthening rim or felly, which may, like the main felly 3, be composed of wood and which is secured to the main felly in any desired way, serving as a reinforcing or strenghening device.

5 designates a preferably metallic channeled rim which is secured to the strengthening rim in any desired way and which encircles the same as shown, said rim 5 having its outer or rim edges bent inwardly preferably at an acute angle to the inner wall to form the two opposite retaining flanges 6. These flanges are designed to enter recesses 7 formed in the tire which is preferably an endless band composed of a plurality of plies of canvas 8 and a rubber tread surface 9 secured thereto. The recesses 7, as shown, extend through the rubber tread surface 9 into the canvas body portion of the tire near the side edges thereof, and the retaining flanges 6 therefore hold the endless band that forms the tire in a transversely flexed and partially compressed condition.

The cushioning or resilient means of my improved wheel comprises resilient elements 10 that are preferably composed entirely of india-rubber and are interposed between the inner or bottom wall of the metallic rim 5 and the tire, and extend end to end circumferentially around the wheel to form practically, when in use, a continuous but sectional resilient element. Each resilient element 10 is substantially of 8-shape in cross section, and is formed with inner and outer longitudinally extending bores 11 and 12. Each section is also formed with laterally bulging portions 13 that preferably terminate at the inner edges of the tire as shown, the said sections being so shaped that their relatively smaller outer portions will fit snugly within the space formed by the flexed band forming the tire, while the bulged portions 13 extend from the tire to the innermost portion of the channeled rim wall, spaces 14 being formed between such bulged portions and the side walls of the channeled rim. Preferably each section is formed at one end with a plurality of protuberances 15 designed to abut against the adjoining end of the next adjacent section or resilient element, to reduce the friction between said elements to the minimum, without the employment of rollers or similar interposed devices.

From the foregoing description in connection with the accompanying drawing, it will be seen that I have provided a resilient wheel which will obtain the desired elasticity of tread, without the use of pneumatic tires and other valves and in which the resilient elements of rubber are protected as far as possible from penetration by glass, nails, tacks, or the like, by the canvas portion of the tire itself as well as the channeled rim 5, and that the said resilient elements are so formed that even should they be penetrated, their walls are sufficiently solid to prevent any collapse of any portion of the wheel. Manifestly, the openings through the resilient elements impart to them additional elasticity as compared to an entirely solid cushion, and as they are practically independent of each other, it is obvious that any one or more of them may be removed and replaced by another, by any mechanic in an expeditious manner, without taking the entire wheel apart.

Having thus described the invention, what is claimed as new is:

1. In a wheel, the combination of a channeled rim formed with inwardly extending edge flanges, an endless band tire formed with side recesses designed to accommodate said flanges and held in a transversely flexed condition in said rim by the engagement of said flanges, the side edges of the tire being spaced from the base of the channeled rim, and resilient elements within the rim and bearing against the base thereof, said elements also fitting in between the side edges of the tire and bearing against the tire, as and for the purpose set forth.

2. In a wheel, the combination of a channeled rim, a band tire held in a transversely flexed condition in said rim, and resilient elements mounted within the rim, said elements being of substantially 8-shape in cross section, and formed with inner and outer longitudinal bores, said elements fitting within the side edges of the rim and formed with bulged portions extending from said side edges to the base of the channel of the rim.

3. In a wheel, the combination of a channeled rim, a band tire held in transversely flexed condition in said rim, and resilient means mounted in the rim and fitting snugly within the side edges of the tire and formed with bulged portions extending from said side edges to the base of the channel of the rim.

In testimony whereof I affix my signature in presence of two witnesses.

RICHARD K. GREGORY. [L. S.]

Witnesses:
   J. S. KUYKENDALL,
   J. H. JOHNSON.